United States Patent [19]
Boni et al.

[11] Patent Number: 5,271,443
[45] Date of Patent: Dec. 21, 1993

[54] DEVICE FOR LOCKING A TIRE

[75] Inventors: Bernard Boni; André Piton, both of Champagne S/oise, France; Pascal Seradarian, Lawrenceville, N.J.

[73] Assignee: Hutchinson, Paris, France

[21] Appl. No.: 816,009

[22] Filed: Dec. 27, 1991

[51] Int. Cl.[5] .............................................. B60C 15/02
[52] U.S. Cl. ................................. 152/400; 152/381.4
[58] Field of Search ............... 152/379.3, 379.4, 379.5, 152/381.3, 381.4, 381.5, 381.6, 382, 384, 387, 388, 389, 400, 399

[56] References Cited
U.S. PATENT DOCUMENTS

| | | | |
|---|---|---|---|
| 4,662,419 | 5/1987 | Winfield | 152/400 X |
| 4,709,738 | 12/1987 | Goodell et al. | 152/400 |
| 4,776,377 | 10/1988 | Susini et al. | 152/400 X |
| 4,823,854 | 4/1989 | Payne et al. | 152/382 |
| 5,060,706 | 10/1991 | Jones et al. | 152/400 X |

FOREIGN PATENT DOCUMENTS

| | | | |
|---|---|---|---|
| 726763 | 9/1942 | Fed. Rep. of Germany | 152/400 |
| 2255012 | 5/1974 | Fed. Rep. of Germany | 152/400 |
| 119441 | 9/1958 | U.S.S.R. | 152/400 |
| 568353 | 3/1945 | United Kingdom | 152/400 |

*Primary Examiner*—Russell D. Stormer
*Attorney, Agent, or Firm*—Herbert Dubno; Yuri Kateshov

[57] ABSTRACT

A tire locking device installed inside the cover of a tire mounted on a wheel rim and exerting pressure on the beads of the cover, urged against the flanges of the rim, includes a metal strip shaped as a cylindrical ring which is split parallel to its generator lines, is provided on both circumferential edges with extrusions made of an elastomer type material. The extrusions are split level with the split in the metal strip, and a means for connecting the edges of the strip with the intrusions form an annular lock of total width which is greater than the nominal spacing between the inside faces of the beads of the cover in which the device is mounted.

1 Claim, 2 Drawing Sheets

DEVICE FOR LOCKING A TIRE

FIELD OF THE INVENTION

The invention relates to a device for locking a tire, the device being of the type known in the art as a "beadlock", i.e. opposes constituted by a member mounted inside the cover of a tire and which opposes loosening of the tire relative to the wheel, i.e. any relative motion between the tire and the rim, with this being done most simply by exerting a pressure on the beads of the cover to force them against the flanges of the rim.

BACKGROUND OF THE INVENTION

Such devices (which are intended to enable a vehicle whose wheels are fitted therewith to conserve sufficient driveability or mobility in the event of a reduction in tire pressure) are fitted, in particular, to the wheels of military vehicles. Numerous embodiments of such devices exist, and by way of example, mention may be made of those described in FR-A-2 246 405 which are constituted by a ring of rubber of dimensions such that after being installed inside the tire cover to which it is fitted, it forces the beads of the cover against the flanges of the rim, thereby preventing the cover from moving relative to the rim in the event of a drop in the inflation pressure of the tires, which may be done voluntarily, e.g. to cross certain types of terrain. Although they are satisfactory, such devices are nevertheless not easy to install and it is necessary to make use of straps with ratchets for deforming the ring and positioning it inside the cover. The non-negligible weight of the solid ring of rubber fitted with cording has an unfavorable effect on the characteristics of a vehicle when all of its wheel are fitted therewith.

OBJECTS OF THE INVENTION

Consequently, a general object of the present invention is to provide a tire locking device of the type mentioned above which nevertheless avoids the drawbacks outlined above, and which in particular is considerably lighter in weight than known devices, and is much easier to install, while performing the function of holding the beads of the tire cover on the rim with the same degree of safety.

Another object of the invention is to provide such a device which is easy to manufacture, and which, in particular, can be made up from standard components so as to provide devices adapted to all tire sizes.

Yet another object of the invention is to provide such a device which, for given wheel and tire cover dimensions, makes it possible to take account of manufacturing tolerances in the rims and the covers, i.e. a device which makes it possible to obtain a satisfactory clamping force (which is neither too tight nor too loose) between the beads of the cover and the flanges of the rim on all wheels having the same nominal dimensions.

Finally, an object of the invention is to provide such a device which is well adapted to the severe conditions of use of vehicle wheels to which it is fitted, whenever such vehicles are called upon to travel over the difficult environments they are designed to be able to manage.

SUMMARY OF THE INVENTION

The present invention provides a "beadlock" type tire locking device, i.e. including a member which, when installed inside the cover of a tire mounted on a wheel rim, exerts pressure on the beads of the cover, urging them against the flanges of the rim. The device comprises a metal strip shaped as a cylindrical ring which is split parallel to its generatrix, and which is provided on both circumferential edges with extrusions made of an elastomer type material or the like. The extrusions are likewise split level with the split in the metal strip. Means is provided for connecting together the edges of said strip to constitute an annular lock of total width (i.e. width occupied by the metal strip and the associated extrusions of elastomer material or the like) which is greater than the nominal spacing between the inside faces of the beads of the cover in which the device is mounted.

Such a device is considerably lighter than known devices for rims of the same given dimensions. In addition, because the metal strip is initially split parallel to the generatrix, it can be deformed together with the elastomer extrusions with which it is fitted without having to make use of straps having ratchets or the like to install them in the tire covers, but merely by twisting them "helically" or "snail-wise".

The metal strip forming the core of the device may be made of high hardness steel, advantageously having a hardness on the order of 80 kg/mm$^2$, whereas the extrusions of elastomer material or the like are preferably made of rubber having good aging characteristics, good elasticity characteristics, and good compressive set (CS) characteristics to avoid creep.

Good results have been obtained with a rubber of the flexible EPDM type, having a hardness on the order of 65 on the Shore A scale.

The extrusions of elastomer material or the like may be shaped on their outside faces (i.e. their faces that are designed to come into contact with the inside faces of the beads of the tire cover) to have a chamfer which, in a preferred embodiment, is in the order of a few degrees relative to the mean diametral plane of symmetry of the device.

In the invention, the circumferential edges of the metal strip may be connected to the extrusions of elastomer material or the like by making use of rivets that are regularly distributed along the circumferential length of each edge of the strip.

In a preferred embodiment, the right cross-section of the metal strip is a channel section and each extrusion includes a hollow in which the folded-up flange of said metal strip is received, the rivets being disposed in the zone of contact between the web of the channel formed by the metal strip and an inwardly directed annular lip on each of the extrusions.

BRIEF DESCRIPTION OF THE DRAWINGS

These and other objects, features and advantages will become more readily apparent from the following description, references which are made.

SPECIFIC DESCRIPTION

Figure 1:
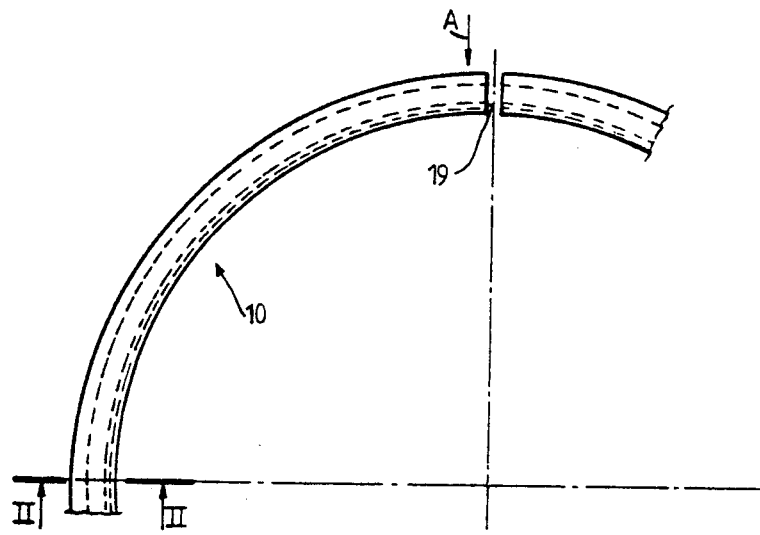
FIG. 1 is a fragmentary elevation view of a device of the invention.
Figure 3:
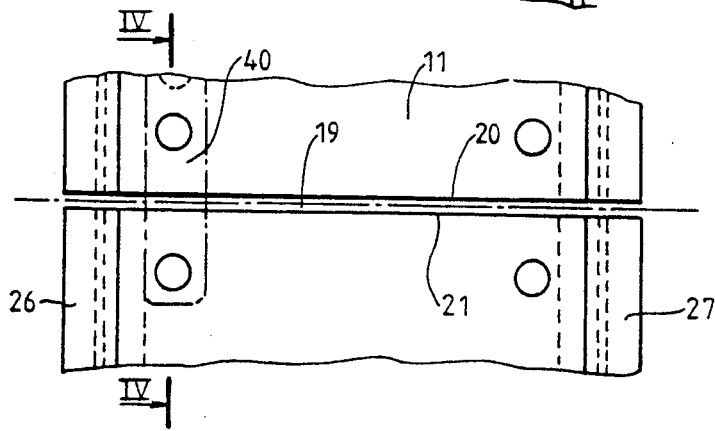
FIG. 3 is a fragmentary view as seen in the direction of arrow A in FIG. 1, and it is on a larger scale of FIG. 1, showing the connection means of the edges parallel to the generator lines of the strip of the device after it has been installed in the cover of a tire.
Figure 4:
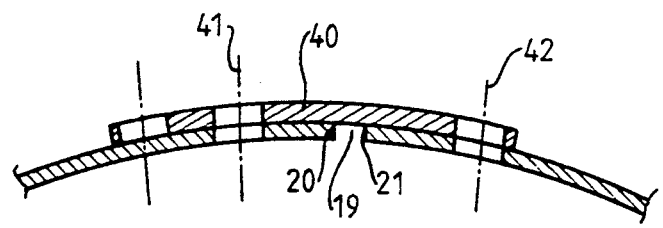
FIG. 4 is a fragmentary view in section along line IV—IV of FIG. 3.
Figure 5:
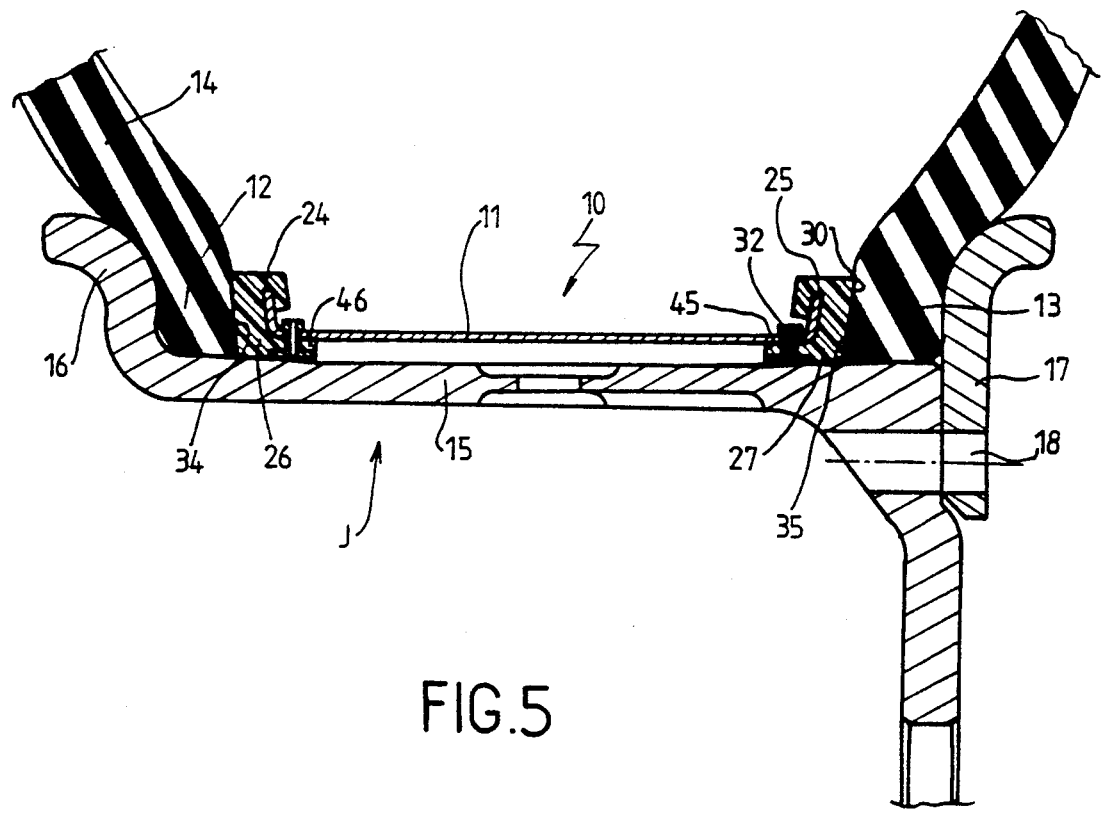
FIG. 5 is a diagrammatic sectional view through a device of the invention in place on a wheel rim fitted with a tire cover.

The device 10 of the invention for locking a tire essentially comprises a metal strip 11 made of high hardness steel (e.g. on the order of 80 kg/mm$^2$) which is treated to withstand corrosion and which is shaped to the form of a cylindrical ring whose width is close to the distance between the inside faces of the beads 12 and 13 of a cover of a pneumatic tire 14 that is designed to be fitted on a vehicle wheel whose rim J (FIG. 5) comprises a web 15 integral with one flange 16 and having a removable flange 17 suitable for fixing to the rim by means represented diagrammatically at 18. The metal strip 11 is shaped in the form of a cylindrical ring that is split parallel to the direction of the generator lines of the ring, and the two sides of the slot 19 formed in this way are at a distance apart from each other as can be seen in FIGS. 1, 3, and 4, and they are designated by reference numerals 20 and 21, respectively.

Figure 2A:
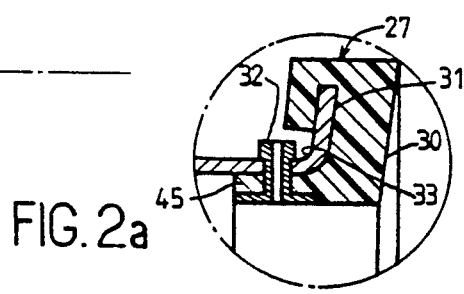
FIG. 2a is an enlargement of a fragment of FIG. 2.
Figure 2:
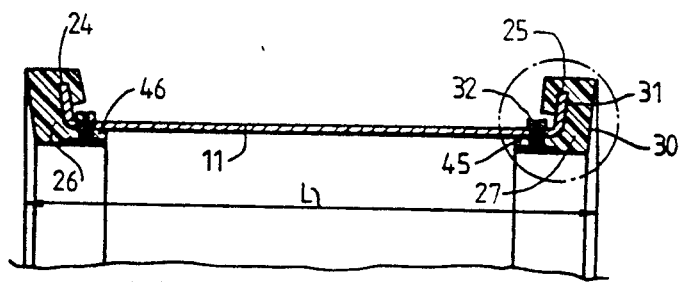
FIG. 2 is a sectional view along line II—II of FIG. 1, and is on a larger scale.

As can also be seen in FIGS. 2 and 2a, the circumferential edges 24 and 25 of the metal strip 11 are folded through about 90° while leaving rounded shoulders 33 thus imparting a generally channel-section shape to the right cross-section of the strip, and two constant section extrusions 26 and 27 of circular plane outline (apart from respective slots level with the slot 19) are fixed thereon, the extrusions being made of an elastomer type material or the like, advantageously a rubber having good elasticity characteristics, good aging characteristics, and having good compressive set characteristics (CS) to avoid creep. In an embodiment that has given good results, this material is a flexible EPDM type rubber having a hardness in the order of 65 on the Shore A scale.

In the embodiment described and shown, the extrusions 26 and 27 have a right cross-section whose outline is inscribed approximately in a parallelogram (FIG. 2a) with an outer face 30 that slopes relative to the front plane P of the device at an angle that may be about 6° to 10° and, a hollow 31 is formed in the thickness of the extrusion in which the folded-up edge of the metal strip is received. Each of the extrusions 26 and 27 is fixed on the metal strip 11 by fasteners such as screws and nuts, or preferably rivets 32, that are regularly spaced apart around the periphery of the metal strip 11 in the vicinity of its rounded shoulders 33, where it comes into contact with inwardly directed annular lips 45 and 46 of the extrusions 26 and 27 respectively.

After the extrusions 26 and 27 have been fixed on the metal strip 11, the width of the device in its unstressed condition is greater than the distance between the inside faces 34 and 35 of the beads 12 and 13 of the cover of the tire 14 when mounted on the rim J, such that when the device is in its assembled condition it exerts a thrust force which presses said beads against the flanges 16 and 17 of the rim, effectively opposing any tendency of the tire 14 to work loose from the wheel in the event of a reduction in inflation pressure of the tire reduced, whether deliberately or involuntarily.

To install a device of the invention, the assembly constituted by the metal strip 11 and its extrusions 26 and 27 is initially installed inside the tire 14 while it is separate from the wheel rim J, with such insertion being most easily performed by twisting the strip to give it a "snail" shape as is made possible by the fact that the metal strip is split along its edges 20 and 21, and the same applies to the extrusions 26 and 27. This deformation can be achieved without using straps and ratchets as are required for conventional solid rubber "beadlock" type rings, and after the device has been put in place inside the tire, the edges 20 and 21 of the slot 19 in the strip 11 are connected together by means of two strips or jumpers 40 (FIGS. 3 and 4) each of which is fixed by means of screws and nuts represented diagrammatically at 41 and 42 in the vicinity of the two edges. The tire and locking device assembly is then installed on the wheel rim J after its removable flange 17 has previously been removed, and optionally using a press as for conventional "beadlock" devices, after which the flange 17 is put back onto the wheel rim J.

Compared with known devices, the advantages of the device of the invention are firstly with respect to weight, a conventional device for a 20" wheel weighs about 27 lb., whereas a device of the invention having a metal strip that is one-tenth of an inch thick weighs only 17 lb.; and secondly the device of the invention is much easier to install and it makes it possible to provides a clamping force which is always satisfactory, neither too much nor too little, for all wheel rims in the same series and in spite of differences in the dimensions thereof and in the dimensions of the tire covers, which force may lie in the range 5 tons to 15 (metric) tons.

We claim:

1. A device for locking the beads of a tire against opposite flanges of a multi-piece rim, said device comprising:

a cylindrical metal strip centered on an axis, said strip being formed with a transverse split bounded by two transverse edges;

a pair of coaxial annular flanges formed on said strip, extending outwardly away from said axis and flanking said strip, each of said flanges on said strip being formed with a respective free end spaced radially outwardly from said strip and being connected to the cylindrical strip by a respective arcuate bend;

a pair of elastomer extrusions adapted to contact said beads, each of said extrusions being mounted on a respective one of said flanges and formed with:

a respective split registering with said split of said strip, a respective radial groove receiving the free end of the respective flange
an inwardly extending portion reaching around the respective bend to underlie the strip,
and an external surface engageable with the respective bead and inclined to a plane perpendicular to the axis by 6° to 10° and substantially parallel to the respective annular flange on said strip;

fastening means for connecting said strip with said extrusions to form an annular lock, said annular lock having a total width larger than a spacing between inside faces of the beads upon mounting of the tire on said rim, said fastening means being a plurality of angularly spaced rivets traversing said strip and said portion adjacent the respective bend; and means including strips extending perpendicular to said transverse edges, bridging said split in said strip and connecting said transverse edges upon lodging of the lock in the tire.

* * * * *